United States Patent [19]
Dentinger et al.

[11] Patent Number: 5,268,695
[45] Date of Patent: Dec. 7, 1993

[54] DIFFERENTIAL PHASE MEASUREMENT THROUGH ANTENNA MULTIPLEXING

[75] Inventors: Michael P. Dentinger, Los Altos; Clark E. Cohen, Palo Alto, both of Calif.

[73] Assignee: Trimble Navigation Limited, Sunnyvale, Calif.

[21] Appl. No.: 957,271

[22] Filed: Oct. 6, 1992

[51] Int. Cl.$^5$ .............................................. G01S 5/02
[52] U.S. Cl. ................... 342/357; 342/442; 342/433
[58] Field of Search ............. 342/352, 357, 386, 407, 342/417, 432, 433, 442, 445

[56] References Cited

U.S. PATENT DOCUMENTS

| | | | |
|---|---|---|---|
| 4,384,293 | 5/1983 | Deem et al. | 342/352 |
| 4,468,793 | 8/1984 | Johnson et al. | 375/97 |
| 4,485,383 | 11/1984 | Maher | 343/100 |
| 4,807,216 | 2/1989 | Holmes et al. | 375/97 |
| 5,021,792 | 6/1991 | Hwang | 342/357 |
| 5,101,356 | 3/1992 | Timothy et al. | 342/352 X |

OTHER PUBLICATIONS

Johnsen, et al., "Applications of a Multiplexed GPS User Set," IEEE, pp. 61–77.

*Primary Examiner*—Mark Hellner
*Attorney, Agent, or Firm*—Thomas E. Schatzel

[57] ABSTRACT

An embodiment of the present invention is a system for time multiplexing a carrier signal received by two or more GPS antennas through a single hardware path, using a single receiver's oscillator in that hardware path as a reference to compare the phase from each antenna. One of the antennas is designated as a reference antenna and a carrier signal received by it is used to phase lock in numerically controlled oscillator. The same carrier signal received by the other antennas is periodically compared in phase to the output of the numerically controlled oscillator. Each comparison results in a phase angle measurement for the respective antennas compared to the master antenna.

8 Claims, 2 Drawing Sheets

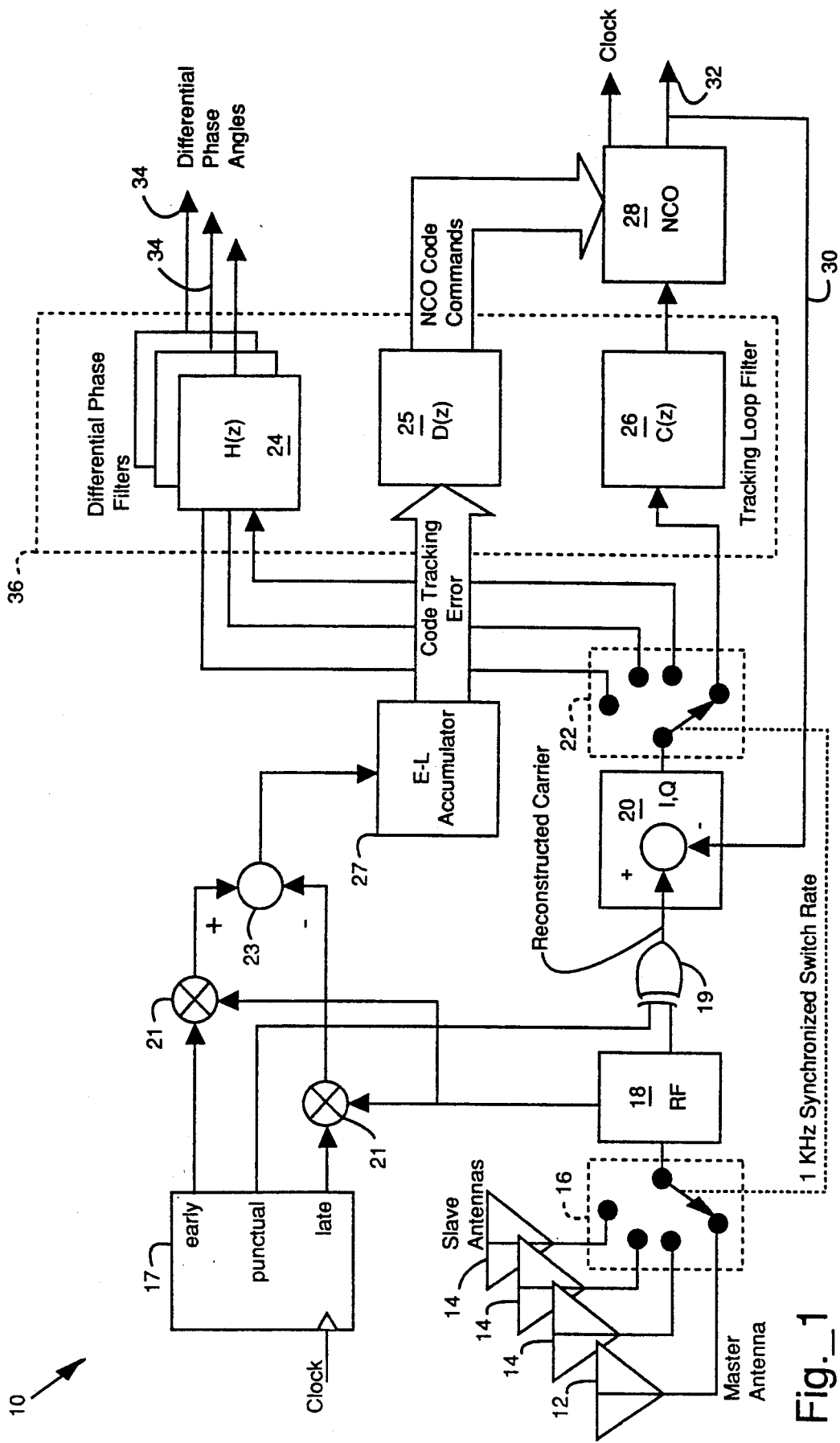
Fig._1

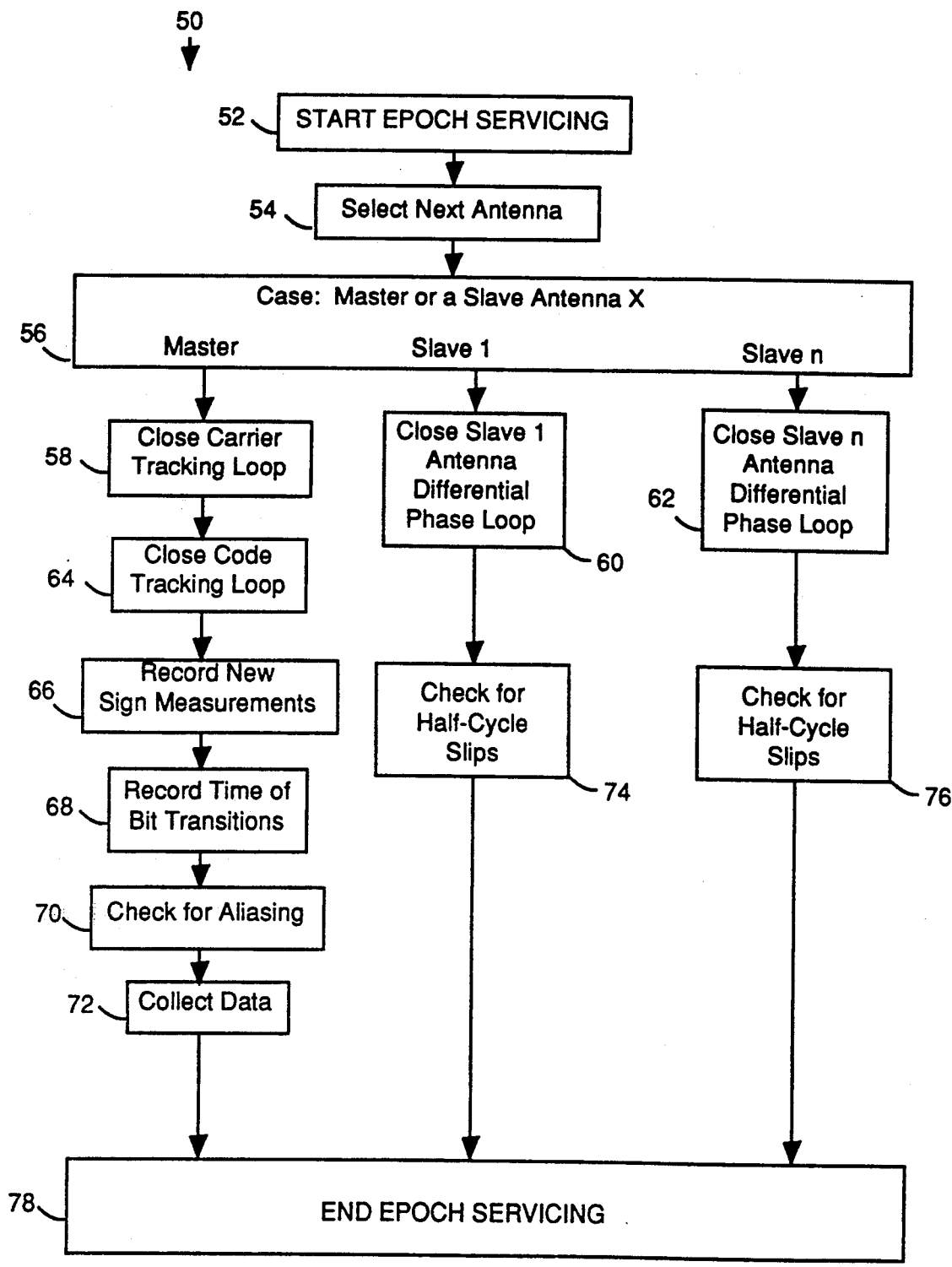
Fig._2

DIFFERENTIAL PHASE MEASUREMENT THROUGH ANTENNA MULTIPLEXING

BACKGROUND OF THE INVENTION

1. Field of the Invention

The invention relates generally to the global positioning system (GPS) and specifically to methods and apparatus for taking the measurement of differential phase of two or more signals from two or more antennas receiving the same GPS satellite carrier so that the attitude may be determined for a platform or vehicle on which the GPS antennas are mounted.

2. Description of the Prior Art

The United States has placed in orbit a constellation of satellites, as part of a global positioning system (GPS), that can be used by civilians and the military alike to get automated and highly-accurate earth position coordinates on easy to read digital displays. Determining where you are has been a particular problem for seafarers for thousands of years. Now, GPS enables small sailboat owners and even individual combat soldiers to get their positions to within a few meters, using handheld portable equipment.

GPS-based attitude determination offers significant cost savings in applications where inertial guidance has traditionally been the standard approach. Attitude is measured by differential measurements of GPS carrier phase between two or more antennas. Performance may be characterized in terms of accuracy and bandwidth, both being dependent on applications specific parameters, such as the antenna spacing, multipath signal interference and the GPS signal carrier-to-noise ratio.

While there are a number of methods in the prior art for measuring the relative phase angle of a carrier received from a pair of antennas, most consist of two nearly identical hardware channels, one for each antenna. The relative phase is then derived from the respective channels. For background, the reader is referred to U.S. Pat. Nos. 4,807,256, issued Feb. 21, 1989 to Holmes, et al.; 4,485,383, issued Nov. 27, 1984, to Maher; and 4,468,7931, issued Aug. 28, 1984, to Johnson, et al. An informative article on this subject matter was also published by C. Johnson, et al., "Applications of a Multiplexed GPS User Set," an article reprinted from the Institute of Navigation (*Navigation* June 1981), Vol.II, 1984 ISBN: 0-936406-01-1, pp.61-77.

Multiple channel systems have inherent biases and are unavoidably duplicative and therefore expensive to manufacture and maintain. A less expensive alternative is therefore needed to make practical applications of GPS attitude determination possible.

SUMMARY OF THE PRESENT INVENTION

It is therefore an object of the present invention to reduce the cost of GPS system hardware capable of determining attitude based on relative carrier phase differences in master and slave GPS antennas.

Briefly, an embodiment of the present invention includes a system for time multiplexing a carrier signal received by two or more GPS antennas through a single hardware path. An oscillator in a single receiver in that hardware path is used as a reference to compare the phase from each antenna. One of the antennas is designated as a reference antenna and a carrier signal received by it is used to phase lock-in a numerically controlled oscillator. The same carrier signal received by the other antennas is periodically compared in phase to the output of the numerically controlled oscillator. Each comparison results in a phase angle measurement for the respective antennas compared to the master antenna.

An advantage of the present invention is that a system is provided in which significantly less hardware is required for conducting differential phase measurements.

Another advantage of the present invention is that a robust system is provided that eliminates systematic biases that are inherent in multiple channel systems, because the signals from each antenna share the same signal path and are therefore exactly canceled out in the differencing operation.

An advantage of the present invention is that a system is provided in which GPS users with difficult antenna field-of-view constraints can track different GPS satellites through a variety of antennas. In space or aircraft applications, vehicle orientation or mounting constraints often prevent a single antenna from having full GPS visibility.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a block diagram of a an attitude measurement system according to an embodiment of the present invention; and FIG. 2 is a flowchart of a computer-implemented process that controls the system of FIG. 1.

DETAILED DESCRIPTION OF THE PREFERRED EMBODIMENTS

FIG. 1 illustrates a GPS carrier phase measurement system 10 that comprises a master antenna 12, a plurality of slave antennas 14, an input multiplex switch 16, a code generator 17, a radio frequency (RF) amplification stage 18, an exclusive-OR (XOR) gate 19, a correlator 20 having in-phase (I) and quadrature (Q) signals, a pair of correlators 21, an output multiplexer 22 that is kept insync with input multiplexer 16, a summing device 23, a plurality of differential phase filters (H(z)) 24, a code tracking filter (D(z)) 25, a tracking loop filter (C(z)) 26, an early-minus-late (E-L) accumulator 27, a numerically controlled oscillator (NCO) 28, a feedback signal 30, an output 32 and a plurality of differential phase angle outputs 34. Multiplex switches 16 and 22 may be constructed with either high speed GaAs field effect transistors (FET) or PIN diodes. A microcomputer (not shown) comprises a software-implemented filtering 36 and controls system 10 by executing a computer process that is flowcharted in FIG. 2. Other control means can be used instead of a microcomputer, but a microcomputer is preferred since it allows software to control all important jobs in system 10 and allows a quick and easy way to modify the behavior of system 10. The process of FIG. 2 is by no means the only way to control system 10. Other approaches will no doubt also prove to be satisfactory. The flowchart structure presented here is merely one example. The differential phase filters 24, code tracking filter 25 and tracking loop filter 26 are implemented in software in this example. Hardware could also be used to implement these elements with equal success.

Any GPS antenna in the group of antennas (12 or 14) shown in FIG. 1 may be designated as master antenna 12. The label "master" is arbitrary. The one antenna that is chosen to be the master antenna 12 will preferably have the strongest signal reception with the least amount of multipath interference. (It would be useful to incorporate a means to constantly re-evaluate the received signal quality and to re-assign which antenna is to be designated as master antenna 12.) Each time multiplexer 16 connects master antenna 12 through to RF amplifier 18, an error signal is produced by correlator 20 that is output to tracking loop filter 26 via output multiplexer 22. A resulting frequency and phase correction is communicated to NCO 28 from tracking loop filter 26. Part of the output of NCO 28 is returned to correlator 20 by feedback signal 30. NCO 28 clocks code generator 17 and produces early, punctual and late outputs. The punctual output is exclusive-OR combined with the carrier signal output by RF amplifier 18 to produce a reconstructed carrier signal. The feedback signal 30 is compared with the reconstructed carrier coming from XOR gate 19.

Eventually, the closed loop feedback will cause NCO 28 to lock-on to the GPS carrier frequency and phase as seen by master antenna 12. Differences in phase coming from slave antennas 14 can then be interpreted as being the result of the slave antenna 14 being closer to or farther away from the particular GPS satellite sending the received carrier signal. Periodically, when input multiplexer 16 selects a slave antenna 14 the output multiplexer 22 sends the output of correlator 20 to a differential phase filter 24. The path between input multiplexer 16 and output multiplexer 22 is thus shared and a need for phase delay matching is thus eliminated. A respective differential phase angle output 34 represents the differential phase angle of the GPS carrier, as seen by the respective slave antenna 14, and as was compared to NCO 28 by correlator 20. It can therefore be mathematically determined with conventional means what angle exists between the GPS radio carrier line of propagation and a baseline drawn between master antenna 12 and the slave antenna 14. If the master antenna 12 and the slave antenna 14 were respectively located on the bow and stern of a ship, the heading of the ship, which is parallel to the baseline between the antennas, can be estimated rather precisely. Tracking loop filter 26 and NCO 28 are such that they are exclusive and will lock-on only to the signals obtained from master antenna 12.

A process 50, illustrated in FIG. 2, comprises a step 52 that begins an epoch (time period) servicing routine. A step 54 selects an antenna (12 or 14) to be used for the next set of measurements and sets input multiplexer 16 accordingly. A step 56 determines if input multiplexer 16 has selected master antenna 12 or one of the slave antennas 14. A step 58 (close carrier tracking loop) updates NCO 28 based on a measured carrier phase tracking error obtained from correlator 20. If a slave antenna 14 has been selected, then either a step 60 or a step 62 are instead called (by step 56) to close a slave antenna differential phase loop, depending on which slave antenna 14 has been selected. A step 64 (close code tracking loop) updates the code phase based on the measured code tracking error from the early-minus-late accumulator (27). As part of the process of doing position fixes with GPS, it is important to concurrently demodulate the GPS data, which is transmitted from the GPS satellite, with multiplexing in a coordinated way. A number of steps are needed to facilitate the process. A step 66 (record new sign measurements) stores the sign of modulation data that has been integrated over a fraction of the data bit period together with a record of the time antenna switches occur. A step 68 (record the time of bit transitions) involves the detection of bit transitions in the GPS data and is a key prerequisite to ranging. Recording the time of these transitions allows the receiver to resolve how many integer C/A code epochs lie between the GPS satellite and the receiver. Multiplexing complicates the resolution of bit transitions because the transitions may occur at different times for separate GPS satellites. Antenna switching is necessarily constrained to affect the signals from all the GPS satellites that are being tracked simultaneously.

In one embodiment, antenna selection in step 54 is set up such that the switching edges will drift with respect to the data bit transition edges. The bit transitions are then possible to detect on all the GPS satellites being tracked. Step 68 (record time of bit transitions) makes use of a stored history of the signs of the received data to detect bit transitions so each transition is not observed across an antenna switching event.

Antenna switching necessarily renders the receiver a sampling device, regardless of whether it is based on digital or analog hardware. It is therefore subject to a condition commonly known as aliasing. Carrier phase rates which correspond to multiples of one half-cycle per antenna switching period alias as direct current, resulting in an error in measured velocity.

Carrier phase errors from correlator 20 are observed during the time the receiver dwells on the master antenna, to determine if an aliasing condition exists. In a step 70 (check for aliasing) such a determination is made on the basis of measurements averaged over several antenna switch periods, rather than just a few, to compensate for receiver noise. If aliasing is detected, the signal tracking is corrected before resuming normal operation. In a step 72 (collect data) the antenna switching in step 54 is scheduled such that the master antenna 12 always catches at least some part of each data bit received from all the GPS satellites being tracked. These parts are integrated and each received data bit is stored in a buffer. The data modulation on the GPS signals corresponds to a sign reversal or 180° phase shift (half-cycle) of the GPS carrier. Therefore, each carrier tracking loop step 58 and differential phase loop step 60 or 62 arbitrarily lock-on to the GPS carrier, modulo one-half a cycle. (The term modulo, as used here, means a granularity of one-half cycle exists, and angles in between half-cycles do not exist for lock-on.) Since the data modulation affects the signals from all the antennas the same, any half-cycle discrepancies between the master antenna and a slave antenna can be resolved. For each GPS satellite being tracked, a pair of steps 74 and 76 (check for half-cycle slips) ensures that all slave antennas maintain the same half-cycle parity with the master antenna. A step 78 ends the epoch servicing process 50.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A direction angle measurement system, comprising:
   at least two GPS antennas for producing a plurality of respective output signals for a GPS carrier signal that differ in phase according to the geometry of the relative positions of the GPS antennas and a GPS satellite transmitting said GPS carrier signal;
   input multiplexing means for selecting one of said output signals from the GPS antennas and having a selected-antenna output signal;
   a radio frequency amplification stage for producing an amplified RF signal from said selected-antenna output signal;
   a correlator for mixing said amplified RF signal with a reference frequency signal to produce a phase detector signal output;
   output multiplexing means synchronized to the input multiplexing means for distributing said phase detector signal output to respective differential phase output signal ports;
   a variable frequency oscillator for generating said reference frequency signal;
   a phase locked loop for controlling the variable frequency oscillator to lock in phase to said selected-antenna output signal during a first time period when a first of said GPS antennas is selected and to substantially not drift from said phase lock at time periods other than said first time period; and
   a phase differencer for measuring a phase difference between said reference frequency signal and said selected-antenna output signal at a second time when a second of said GPS antennas is selected, wherein said phase difference is proportional to a differential range between the GPS antennas and said GPS satellite.

2. The system of claim 1, wherein:
   the input multiplexing means comprises at least two high-speed GaAs FET switches that sequentially feed the output of each GPS antenna into the correlator.

3. The system of claim 1, wherein:
   the input multiplexing means comprises at least two high-speed PIN diodes that sequentially feed the output of each GPS antenna into the correlator.

4. A measurement system, comprising:
   a single GPS hardware channel having a correlator output;
   multiplex means for high-speed electronic sequential feeding of the output of more than one GPS antenna into the single GPS hardware channel;
   means for designating a signal from one of said GPS antennas as a master to serve as a GPS carrier phase reference;
   loop means for tracking a GPS carrier when said master signal passes through said GPS hardware channel and locking said correlator output of the single GPS hardware channel to the master signal;
   isolation means for running the loop means open-loop when any of the signals from GPS antennas not said master signal runs through said GPS hardware channel; and
   measurement means for reading a carrier phase angle at said correlator output of the single GPS hardware channel.

5. The system of claim 4, further comprising:
   transfer function means for filtering raw differential phase measurements from said correlator output of the single GPS hardware channel with H(z); and
   clocking means for advancing the multiplex means at a rate sufficient to allow the system to track differential phase dynamics.

6. A method of attitude determination, the method comprising the steps of:
   time multiplexing at least a first and a second antenna signal having independent phase relationships that are respectively received by two or more corresponding GPS antennas;
   phase locking a variable frequency oscillator to one of said antenna signals during a first time period when said one antenna signal is being time multiplexed; and
   comparing the phase of another than said one antenna signal to a reference frequency signal output of said variable frequency oscillator at a second time period that is sufficiently proximate to said first time period wherein said variable frequency oscillator does not substantially drift from said phase lock and said phase comparison will result in a difference that is proportional to a differential range between said GPS antennas and a GPS satellite.

7. The method of claim 6, further comprising the steps of:
   defining one of said GPS antennas as a reference position wherein the step of phase locking comprises phase locking said variable frequency oscillator to said particular one GPS antenna.

8. A process for antenna phase angle measurement wherein a plurality of GPS antennas are multiplexed into a common correlator and one of the antennas is arbitrary selected to act as a master reference for an oscillator, the process comprising the steps of:
   selecting an antenna from a group of slave antennas and a master antenna to be used for a next set of measurements;
   setting an input multiplexer according to said antenna selected;
   determining if said input multiplexer is on a master antenna or a slave antennas;
   updating a numerically controlled oscillator based on any measured carrier phase tracking error obtained from a correlator at the output of said input multiplexer;
   closing a slave antenna differential phase loop, if a slave antenna has been selected;
   updating a code phase based on a measured code tracking error from an early-minus-late accumulator;
   concurrently demodulating GPS data transmitted from a GPS satellite with antenna selecting
   storing the sign of modulated data that has been integrated over a fraction of the data bit period together with a record of the time that antenna switches occur, wherein a detecting of bit transitions in said GPS data permits ranging and said recording the time of bit transitions allows a receiver to resolve how many integer C/A code epochs lie between a particular GPS satellite and receiver;
   drifting antenna selection timing such that the switching edges will drift with respect to said data bit transition edges such that bit transitions are possible to detect on all GPS satellites being tracked;

accessing a stored history of signs of said received data to detect bit transitions wherein each transition is not observed across an antenna switching event;

observing carrier phase errors from a correlator while dwelling on said master antenna to determine if an aliasing condition exists, wherein such a determination is made on the basis of measurements averaged over several antenna switch periods to overcome receiver noise;

correcting signal tracking if aliasing is detected in the step of observing;

scheduling antenna switching such that said master antenna always catches at least some part of each data bit received from all the GPS satellites being tracked; and integrating said parts of each data bit received and storing each received data bit in a buffer.

* * * * *